Patented July 2, 1946

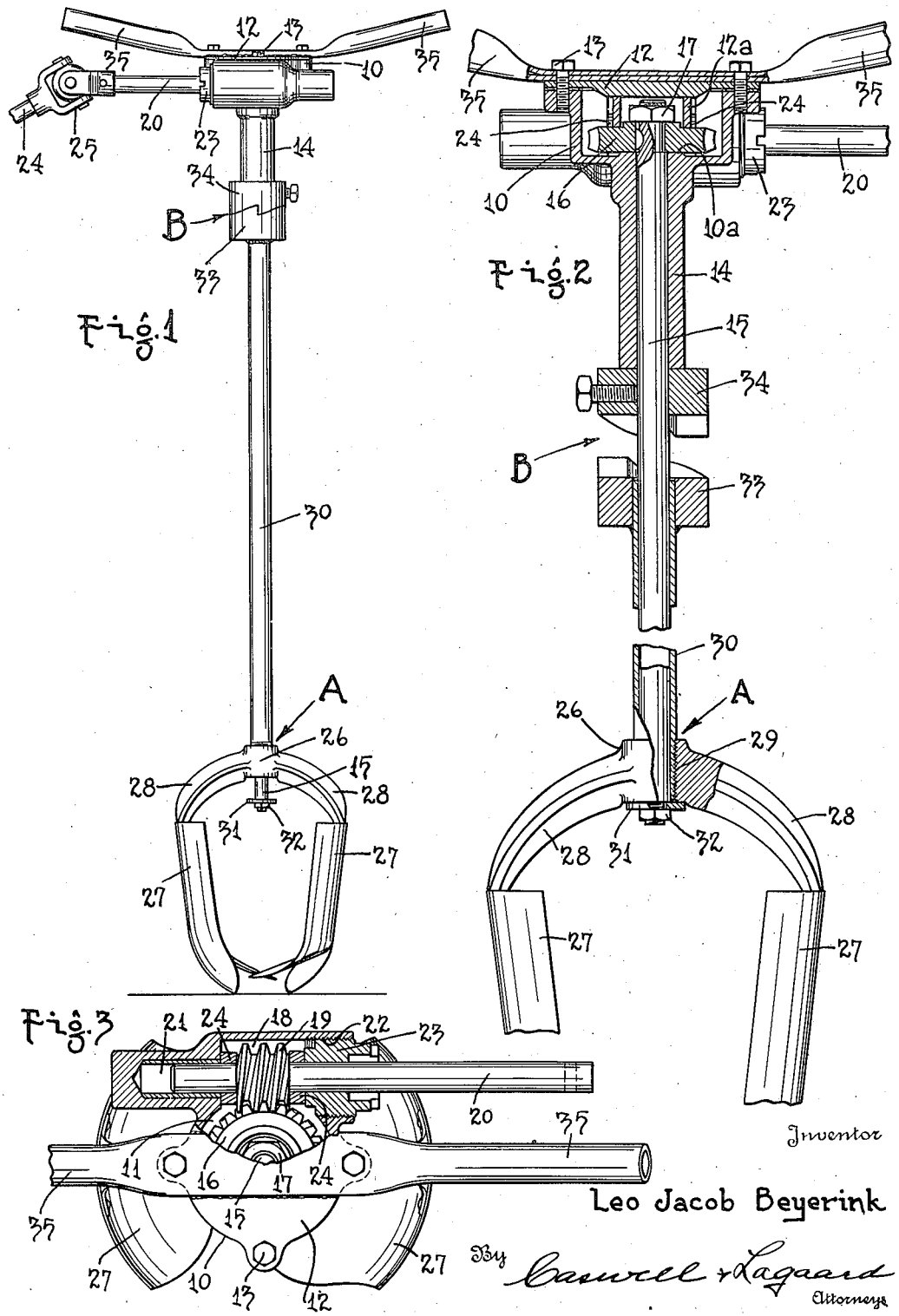

2,403,041

UNITED STATES PATENT OFFICE 2,403,041

POST-HOLE DIGGER

Leo Jacob Beyerink, Union Township,
Carroll County, Iowa

Application September 4, 1944, Serial No. 552,670

2 Claims. (Cl. 255—19)

My invention relates to improvements in posthole diggers and has for an object thereof to provide a simple, durable and relatively inexpensive device of the instant nature adapted to be driven from a source of power and to be conveniently moved about and manipulated by the user in the operation thereof.

More specifically it is an object of my invention to provide a portable post-hole digger, characterized as above, and having a body member and an auger member axially movable relative to said body member, together with means operable to effect the driving of said auger from said source of power in one such relation of the auger and to render said source of power ineffective in another such relation of said auger.

Still more specifically, it is an object of my invention to provide a post-hole digger of the nature above noted in which the auger includes a driven shaft telescopically movable on a drive shaft carried by the body member, and in which said shafts are supplied, respectively, with companion clutch members adapted to be engaged in the one relation of the auger and to be disengaged in the other relation thereof.

Other objects of the invention reside in the novel combination and arrangement of parts and in the details of construction hereinafter illustrated and/or described.

In the drawing, Fig. 1 is a side elevational view of a post-hole digger constructed in embodiment of the present invention; Fig. 2 is a view of the same device showing the side thereof opposite to that shown in Fig. 1, said view being somewhat enlarged over Fig. 1 and broken away to reveal construction not seen in said Fig. 1; Fig. 3 is a plan view of said device with a portion of the case broken away to reveal the gears of the power transmission therein.

Reference being had to the accompanying drawing, wherein similar parts are designated by similar reference characters throughout the several views, it will be seen that the illustrated embodiment of my invention includes a case-like body 10 providing a gear compartment 11 closed at the top by a cover 12 fastened in place with screws 13. Depending from the body 10 is a sleeve-bearing 14 in which a drive shaft 15 is journaled, said drive shaft being reduced at the end portions thereof and threaded, as shown. A worm-wheel 16 keyed on the upper reduced end portion of the drive shaft 15 and made fast thereto by a nut 17, is accommodated in the gear compartment 11 of the body 10. The lower face of this worm-wheel 16 bears against an end-thrust member consisting of a boss 10ª formed on the body 10 within the gear compartment 11. Interposed between the upper face of the worm-wheel 16 and the cover 12 is a second end-thrust member 12ª in the form of a ring. In a bay 18 at one side of the gear compartment 11 is a worm-screw 19 meshing with said worm-wheel 16. This worm-screw 19 is formed on a countershaft 20, the inner end of which is journaled in a bearing 21 provided within the body 10. An opening 22 in said body 10 for admitting said worm-screw 19 into the bay 18 of the gear compartment 11 is normally closed with an axially bored plug 23 threaded thereinto and providing a second bearing in which said countershaft 20 is journaled. End-thrust collars 24 encircle the counter shaft 20 at opposite ends of the worm-screw 19, one collar being seated against a wall of the gear compartment 11 and the other against the inner end of said plug-bearing 23. The outer end of the counter-shaft 20 extends beyond the plug-bearing 23 and is connected by a tumbling rod or other suitable flexible means with suitable powering means such as the power take-off of a tractor. In Fig. 1 of the drawing, I have shown a section 24 of a tumbling rod and a universal joint 25 connecting said section 24 with the counter-shaft 20.

Mounted on the end of the drive shaft 15 which projects from the sleeve-bearing 14 is an auger A including a yoke 26 having cutting blades 27 secured to its branches 28. Said yoke is formed with a threaded bore 29 medially thereof and a shank for the auger in the form of a tubular shaft 30 is tightly screwed into said bore. This tubular shaft 30 is telescopically fitted on the drive shaft 15 for rotation and for axial movement relative thereto, the lower end of said drive shaft 15 projecting downward beyond the yoke 26. A washer 31, fitting the lower reduced end of the drive shaft 15 and held in place by a nut 32 screwed thereon, provides an abutment or stop for the yoke 26 limiting the descent of the auger A on the drive shaft 15. At the upper end of the tubular shaft 30 is one member 33 of a jaw clutch B and keyed on the drive-shaft 15 above said clutch member 33 is a companion member 34 of such clutch, said clutch members 33, 34 being separated and disengaged from each other when the yoke 26 of the auger A is in engagement with the stop washer 31 on the drive shaft 15 (Fig. 2).

Secured to the body 10 by the cover fastening screws 13 are handles 35 by which the device is manipulated.

Preparatory to the digging of a post-hole, the device is carried by its handles 35 to the selected site with the drive shaft 15 rotating and the auger A clear of the ground and unclutched from said drive shaft. Thereupon, the device is lowered to ground the auger A and to depress the remainder of the device so that the clutch member 34 on the drive shaft 15 is caused to engage the clutch member 33 on the auger shank 30 (Fig. 1). Thence, the auger A is rotated by the drive shaft 15 and the blades 27 turn and cut into the ground in the usual manner, the severed soil accumulating between the blades. To unload the accumulated soil from the blades 27, the device is lifted from the ground, the initial lifting movement being attended with the unclutching of the auger A from the drive shaft 15 which then freely turns relative to said auger. With the auger A idle on the drive shaft 15, the device is readily manipulated to knock the blades 27 against the ground and dislodge from them the soil that has accumulated therebetween. Having cleared the auger for further operation, the hole that has been started will be deepened in the manner in which the first stage thereof was dug. Repeating the operation, stage by stage, the user can readily dig a hole limited in depth only by the length of the device.

A user can quickly and easily elevate the body of the device the short distance required to disengage the clutch members 33, 34 and thus protect himself and the device from injury in the event that the blades 27 encounter roots, stones or other solid matter upon cutting into the soil.

Changes in the specific form of my invention, as herein described, may be made within the scope of what is claimed without departing from the spirit of my invention.

Having described my invention, what I claim as new and desire to protect by Letters Patent is:

1. A post-hole digger comprising a case-like body, a driving shaft journaled in said body and depending therefrom, a counter-shaft journaled in the body and adapted to be rotated through flexible means from a remote source of power, transmission gearing housed within said body and interposed between said counter-shaft and drive shaft for rotating the latter from the former, an auger including a tubular shaft, a yoke medially secured to the lower end of said tubular shaft, and blades on the branches of said yoke, said tubular shaft being telescopically fitted over the drive shaft for rotary and sliding movements thereon with the lower end of said drive shaft extending beneath said yoke, a clutch having interengageable members, one on the drive shaft and one on said tubular shaft, handle means on the body for manipulating the digger to lower said body relative to the grounded auger and effect the downward sliding movement of the drive shaft relative to said tubular shaft to cause the interengagement of said clutch members, said handle means serving also in the manipulation of the digger to elevate said body relative to the auger and thus effect an upward movement of the drive shaft relative to the tubular shaft to cause the disengagement of said clutch members, and a limit stop on the drive shaft engageable with said yoke to arrest the upward movement of the drive shaft relative to the tubular shaft following the disengagement of said clutch members.

2. A post-hole digger comprising a body, a drive shaft journaled thereon and depending therefrom, means carried by the body and energized from a remote source of power for continuously rotating the drive shaft, an auger including a cutting head and a shank therefor in the form of a tubular shaft, said shank being telescopically fitted over the drive shaft for rotary and sliding movements thereon, a clutch having interengageable members, one on the drive shaft and one on said shank, and handle means on the body for manipulating the digger to lower said body relative to the grounded auger and effect the downward sliding movement of the drive shaft relative to said shank to cause the interengagement of said clutch members, said handle means serving also in the manipulation of the digger to elevate said body relative to the auger and thus effect an upward movement of the drive shaft relative to said shank to cause the disengagement of said clutch members and means for limiting such upward movement of the drive shaft relative to said shank, said means comprising a stop member at the lower end of said drive shaft and a coacting companion member at the lower end of said shank.

LEO JACOB BEYERINK.